J. E. MACK.
PRINTED INSTRUMENT.
APPLICATION FILED DEC. 16, 1915.
1,222,010.
Patented Apr. 10, 1917.
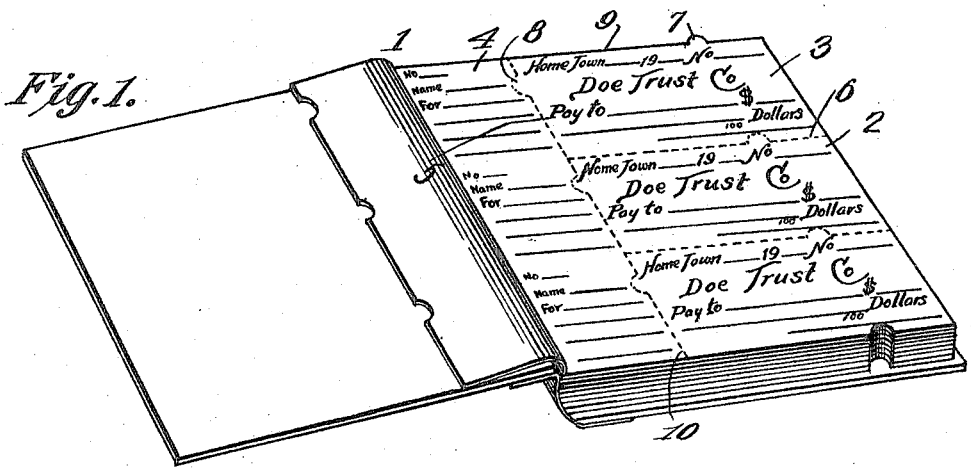
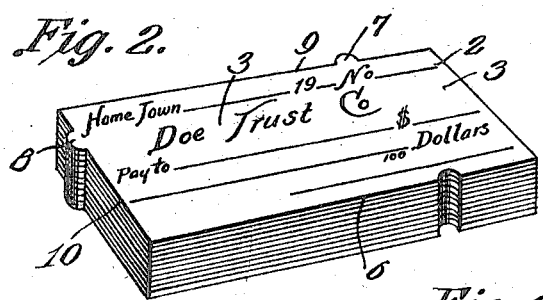
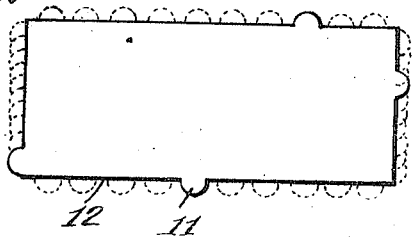
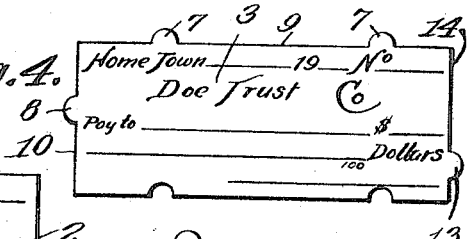
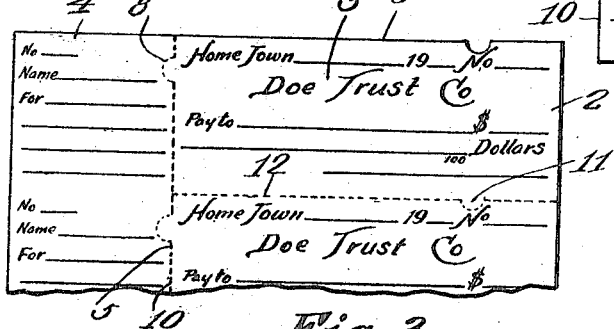
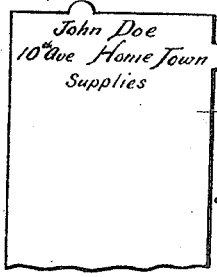
Witnesses:
James F. Crown
A. A. Hines
Inventor
James Edward Mack,
By
Attorney

UNITED STATES PATENT OFFICE.

JAMES EDWARD MACK, OF RAY BROOK, NEW YORK.

PRINTED INSTRUMENT.

1,222,010.   Specification of Letters Patent.   Patented Apr. 10, 1917.

Application filed December 16, 1915. Serial No. 67,194.

*To all whom it may concern:*

Be it known that I, JAMES EDWARD MACK, a citizen of the United States of America, residing at Ray Brook, in the county of Essex and State of New York, have invented certain new and useful Improvements in Printed Instruments, of which the following is a specification, reference being had therein to the accompanying drawing.

This invention relates to printed instruments, such as bank checks, letterheads and other business stationary, etc., and particularly to an improved construction of printed sheet or instrument whereby the operation of handling and sorting the same may be facilitated and discrepancies or frauds detected.

The object of the invention is to provide a printed sheet or instrument having certain of its outlines changed from straight lines to broken lines and portions of the broken line arranged to serve as indicators, whereby the checks and printed matter used by any certain person may be distinguished from the printed matter used by others.

A further object of the invention is to provide a check or similar instrument embodying the features of the invention, whereby errors, frauds and forgeries may be the more easily detected.

The invention consists in the features of construction, combination and arrangement of parts more fully hereinafter described and claimed, reference being had to the accompanying drawing, wherein—

Figure 1 is a perspective view showing the application of the invention to a check book in which the checks are printed in sheets, the book being opened to expose one of the sheets and show the features of construction;

Fig. 2 is a view of a stack of checks of a similar style illustrating how the indicating elements should register in order to show that all the checks are from the same source;

Fig. 3 is a view of a portion of a check sheet showing a slightly modified form of construction;

Fig. 4 is a view of a check blank showing another modified form of construction;

Fig. 5 is a view of a sheet, such as a check blank sheet, illustrating diagrammatically in full and dotted lines the arrangement of the indicating elements of the different groups in the system of indication; and Fig. 6 is a view illustrating the application of the invention to a sheet of business stationary, such as a letterhead.

Referring to Figs. 1 and 2 of the drawing, 1 designates a check book or other similar book in which the checks are arranged in the form of sheets 2, of any desired number of check forms or blanks 3 to a sheet, and which checks are bound into the book by means of stubs 4, each check being separable at one end from its stub by a perforated or weakened vertical line 5 and from the adjacent check by a perforated or weakened horizontal line 6. The check sheets and checks, as thus far described, are of ordinary construction and may be printed or engraved with any desired style of check form, including spaces to receive the entries to be made thereon.

In accordance with my invention, I provide the checks with broken or irregular lines, forming projecting tabs or indicators, having a certain specified arrangement and relationship in each check, whereby the source of origin of any particular check may be determined. For instance, it may be assumed that the check book in question is owned and used by a certain depositor at a certain bank, and the indicating devices upon these checks used by this certain depositor are designed and intended to be disposed in different arrangement and relationship from the checks of other depositors of the same bank, so that provision will be made in sorting and separating the checks of different depositors from each other, as well as in enabling frauds or errors pertaining to any particular account to be more readily and easily detected.

As shown in the present instance, each check 3 is provided along its upper edge with an indicating member, projection or tab 7, and along one of its end edges with an indicating member, projection or tab 8, these projections or tabs having a determined width and arrangement along the respective edges 9 and 10 of the check so as to indicate that the check in question relates to a particular account, such arrangement and relationship of the tabs constituting a means by which the checks of various accounts may be readily selected and distinguished from each other. For the purpose of indicating, say, a distinguishing number of a certain account, the tabs are arranged in specified positions, and the tabs 7 may be considered as indicating units and the tabs 8 as indicating tens, so that the number of the account may be ascertained and determined by their positions along the edges 9 and 10. It will, of course, be understood that the tab 11, having the same indicating character as the tab 7, may be arranged at the lower edge 12 of the check, as shown in Fig. 3, and this may constitute the units tab and the tab 8 the tens tab, or the indicating relationship of these tabs, so far as numerical progression is concerned, may be the same as in Figs. 1 and 2.

If it should be desired to carry the range or extent of numerical indication to a further degree, two or more of the indicators 7 may be positioned upon the longitudinal edge 9 of the sheet, as illustrated in Fig. 4, and an indicating tab or tabs 13 may be provided upon the outer end edge 14 of the sheet, or tabs may be arranged upon all the edges of the sheet, as indicated in Fig. 5. In extending the tabs beyond a range of position on two of the edges of the sheet, it will be evident that the tabs upon a third edge may constitute hundreds tabs and the tabs upon the fourth edge thousands tabs. Thus, the tab or tabs 7 upon the edge 9 may constitute a units tab or tabs, tabs 8 upon the edge 10 or edge 5 tens tabs, tabs 11 upon the edge 12 or edge 6 hundreds tabs, and tabs 13 upon the edge 14 thousands tabs, or any desired relationship or numerical expression of these tabs with respect to each other may be adopted.

By reference to Fig. 5, the indicating values of these tabs will be readily understood, such view illustrating diagrammatically the number and arrangement of tabs in a complete series of checks constructed according to the system of indication, there being, as illustrated, ten tabs or ten positions for tabs along the line of each edge, one being shown, for purposes of example, in full lines along each edge and the remainder of like tabs in dotted lines. Thus the numerical or indicating value of each tab, which is of a determined width with relation to the length of its edge or line, will be determined by its position upon its particular line, and by the use of such tabs, variously arranged upon two or more of the edges of the checks used by all the depositors of a bank or similar institution, the arrangement of the tabs upon each check of a series differing from all of the others, the numerical value of each check or the number of the account represented thereby may be determined or physical differences presented to distinguish the checks of various accounts from each other.

It will be evident from the foregoing description that by the use of checks having variously arranged indicators of the character described, the number of any given account up to a range of from 99 to 9999 may be determined by a simple inspection of the check by one familiar with the notation system, and that these indicators further facilitate the handling and sorting of the checks in enabling different checks to be distinguished and separated and like checks to be assembled or brought together, thus simplifying and reducing the work of handling and sorting. Furthermore, the use of the described indicators is of great value in determining whether or not a certain depositor has used a proper check, and in detecting discrepancies and frauds, as in sorting the checks of any certain account the presence of any check having different indicating values from another may be instantly determined. In this way, particular attention may be drawn to any particular check with greater protection to the bank and customer in enabling forgeries or frauds to be more easily and speedily detected.

While in the present instance I have shown tabs or projections of arched form or segmental contour, it will be evident that they may be of any suitable form or contour, and may be of any desired arrangement for indicating relative values or numerical expressions. As mathematical expression is produced by the interchange of the Arabic numerals, so that isolation or identification of a check by means of this invention is accomplished by the use of two or more series of indicators, corresponding in number to the arrangement of like indicators upon an initial diagram upon which all of the indications are based. Where it is more convenient to use loose or padded checks, the indicators may be cut with dies or otherwise, and in that case the void directly beneath the top indicator caused by checks being perforated in multiple may be omitted. As will be readily understood, the system requires that the accounts of an organization be given distinguishing numbers and that each account use only the indicators assigned to that number. The handling and sorting of checks by the use of such indicators is thereby rendered mechanical and the detection of errors facilitated to a remarkable degree.

The improved mode of indicating may be employed upon letterheads or business stationery generally, as indicated in Fig. 6, wherein a letterhead or like business sheet 15 is shown as provided with indicators of the character described along one of its horizontal and one of its vertical edges, the arrangement of these indicators determining the number of the party using such stationery as applied to a certain organization or business system. By this means the file or account to which any certain sheet belongs may be quickly determined, and upon arranging like sheets in a given manner so as to bring their indicators into comparison positions the work of handling and assorting various letters or sheets of different accounts, individuals, concerns or departments may be rapidly carried out.

In the application of the invention to a check or other like instrument, it will, of course, be understood that an indicator 11 may be employed at the bottom edge to express units in connection with an end indicator 8 expressing tens, and checks of this style may be handled and sorted by simply reversing them, so as to rest upon their upper edges 9.

While I have illustrated the use of indications along two or more edges of the instrument, it is to be understood that the indications may be provided upon one edge only of an instrument, leaving the other edges straight or blank, the indications denoting by their relationship or positions certain indicating values, as hereinbefore described.

Having thus described my invention, I claim:

1. In a cryptographic check system, a plurality of checks of a form to be used in a pack, each check having edge tabs, the location of each tab upon its edge representing a certain numerical value, there being not more than one tab upon each edge, the tabs of different checks being differently located upon the respective edges thereof, whereby the tabs of different checks denote different numerical values distinguishing the various individual accounts represented by the checks from each other.

2. In a cryptographic check system, a plurality of checks of a form to be used in a pack, each check having edge tabs, the location of each tab upon its edge representing a certain numerical value, there being not more than one tab upon each edge, the tabs of different checks being differently located upon the respective edges thereof, and the tabs of different values upon like edges of the checks when arranged in a pack being spaced equally from center to center thereof along such edges, whereby the tabs of different checks denote different numerical values distinguishing the various individual accounts represented by the checks from each other.

In testimony whereof I hereunto affix my signature in the presence of two witnesses.

JAMES EDWARD MACK.

Witnesses:
J. J. FARRINGTON,
ALBERT H. GOWIN.

Copies of this patent may be obtained for five cents each, by addressing the "Commissioner of Patents, Washington, D. C."